(12) United States Patent
Darlet

(10) Patent No.: US 9,114,564 B2
(45) Date of Patent: Aug. 25, 2015

(54) EQUIPMENT FOR DRAWING A FILM MADE OF SYNTHETIC MATERIAL

(76) Inventor: Jean-Pierre Darlet, Shanghai (CN)

( * ) Notice: Subject to any disclaimer, the term of this patent is extended or adjusted under 35 U.S.C. 154(b) by 0 days.

(21) Appl. No.: 13/700,909

(22) PCT Filed: May 17, 2011

(86) PCT No.: PCT/FR2011/051097
§ 371 (c)(1),
(2), (4) Date: Feb. 1, 2013

(87) PCT Pub. No.: WO2011/151557
PCT Pub. Date: Dec. 8, 2011

(65) Prior Publication Data
US 2013/0129854 A1    May 23, 2013

(30) Foreign Application Priority Data
Jun. 2, 2010 (FR) .................................... 10 54289

(51) Int. Cl.
B29C 55/02    (2006.01)
B29C 55/08    (2006.01)
B29C 55/14    (2006.01)

(52) U.S. Cl.
CPC ................. *B29C 55/02* (2013.01); *B29C 55/08* (2013.01); *B29C 55/143* (2013.01)

(58) Field of Classification Search
CPC ...... B29C 55/02; B29C 55/08; B29C 55/085; B29C 55/143; B29C 55/146; B29C 55/12; B29C 55/14; B04C 9/00; B04C 3/00; B04C 3/02; B04C 3/06; B01D 45/10; B01D 45/16
USPC ............. 165/163; 432/152, 200; 425/74, 363, 425/383; 264/37.17, 37.18, 27.2, 37.2
See application file for complete search history.

(56) References Cited

U.S. PATENT DOCUMENTS

| 4,310,301 A * | 1/1982 | Mayers et al. ................. 432/121 |
| 4,432,917 A * | 2/1984 | Hungerford ................. 264/40.1 |

(Continued)

FOREIGN PATENT DOCUMENTS

| JP | 55105535 A | 8/1980 |
| JP | 11342535 A | 12/1999 |

(Continued)

OTHER PUBLICATIONS

Tatsufumi et al. (JP 2003 025422 A), Japanese to English machine translation done on Apr. 3, 2014, plus Bib. data sheet appended as front page.*

(Continued)

*Primary Examiner* — Joseph S Del Sole
*Assistant Examiner* — Lawrence D Hohenbrink, Jr.
(74) *Attorney, Agent, or Firm* — Cantor Colburn LLP

(57) ABSTRACT

The invention relates to equipment (3) for drawing a film made of synthetic material, which includes longitudinal drawing means (11) and transverse drawing means (15) comprising a drawing enclosure (16), an air outlet opening (17) leading into the enclosure and an air inlet opening (18) leading into the enclosure. The transverse drawing means further comprise an air recirculation circuit (19) connecting the air inlet and outlet openings (18, 17) and designed to redirect the air from the air outlet opening towards the air inlet opening. The air recirculation circuit (19) comprises a cyclone separation device (21) including a body (22) defining a separation chamber (23), an inlet port (24) leading into the separation chamber and connected to the air outlet opening (17) of the enclosure so as to enable an air/additives mixture to be introduced into the separation chamber, an air outlet port (25) leading into the separation chamber and connected to the air inlet opening (18) of the enclosure, and an additive outlet port (26) leading into the separation chamber.

14 Claims, 4 Drawing Sheets

(56) References Cited

U.S. PATENT DOCUMENTS

| | | | | |
|---|---|---|---|---|
| 4,636,341 | A * | 1/1987 | Murley | 264/37.17 |
| 5,131,462 | A * | 7/1992 | Andreasen | 165/111 |
| 5,843,211 | A * | 12/1998 | Bielefeldt | 95/269 |
| 2005/0145370 | A1* | 7/2005 | Merryfull | 165/104.19 |
| 2006/0196631 | A1* | 9/2006 | Small et al. | 165/10 |
| 2009/0193971 | A1* | 8/2009 | McFarland et al. | 95/220 |
| 2009/0314161 | A1* | 12/2009 | Al-Alusi et al. | 95/271 |
| 2011/0226129 | A1* | 9/2011 | Huziwara et al. | 95/271 |
| 2013/0040256 | A1* | 2/2013 | Ebner et al. | 432/9 |

FOREIGN PATENT DOCUMENTS

| | | |
|---|---|---|
| JP | 2003025422 A | 1/2003 |
| JP | 2008100456 A | 5/2008 |

OTHER PUBLICATIONS

International Search Report issued Sep. 13, 2011 re: PCT/FR2011/051097; p. 4; citing: JP 55 105535 A, JP 11 342535 A, JP 2003 025422 A and JP 2008 100456 A.

* cited by examiner

EQUIPMENT FOR DRAWING A FILM MADE OF SYNTHETIC MATERIAL

TECHNICAL FIELD

The present invention relates to equipment for drawing films in synthetic material in the longitudinal direction and in the transverse direction, and more particularly equipment for sequential drawing of films in synthetic material in which the drawing in the longitudinal direction and the drawing in the transverse direction take place sequentially.

BRIEF DISCUSSION OF RELATED ART

Bi-oriented synthetic material films are obtained from an extruded ribbon, after having deposited the molten material (polypropylene, polyester, polyamide, PVC, etc.) on a casting drum cooled by circulation of fluid so as to slow down crystallization of the film and to allow its subsequent drawing.

The extruded ribbon cooled to a temperature close to room temperature then passes into a longitudinal drawing machine equipped with preheating cylinders intended to heat up the ribbon to the drawing temperature, and a train of cylinders driven at different speeds and intended to longitudinally draw the ribbon, which has the effect of reducing, in the approximate proportion of the speeds, the thickness of the ribbon.

The thereby drawn ribbon in the longitudinal direction then penetrates into a transverse drawing machine which includes two groups of nips which respectively take the ribbon on both of its sides, the two groups of nips being mounted on chains, the spacing apart of which gradually increases until it reaches the desired width.

During this operation, the width of the ribbon, and therefore its surface, are considerably increased to the detriment of its thickness. This operation can only be performed, provided that the film and the assembly of nips which accompany it are maintained during the whole transverse drawing at the desired temperature.

Before arriving to the location where the nips diverge, the drawn ribbon in the longitudinal direction should have attained throughout its thickness, a homogeneous temperature, generally greater than the longitudinal drawing temperature.

After having achieved transverse drawing in the enclosure at a high temperature, it is generally necessary that the molecular orientation state which has been obtained by means of the dual drawing, be made definitive by controlled crystallization of the ribbon which therefore has to be maintained by the high temperature nip system for the whole time required for achieving the desired crystallization rate.

When this operation has been performed, a suitable device opens the nips and allows the thereby formed film to be transferred, after cooling on an assembly of cylinders, to a winding device at which the film is wound on a storage roll.

This short description of the bi-orientation device indicates that the plastic granules which were used for making the extruded ribbon, and which are generally stored at room temperature, have in a first phase to be raised up to the melting temperature so as to be extruded, and then suddenly cooled in order to avoid crystallization, and then heated up to the longitudinal drawing temperature, again raised up to the transverse drawing temperature and maintained at the crystallization temperature during the required time. This process is therefore eminently energy-consuming, considering its successive heating and cooling phases.

A modern production line of bi-oriented film corresponds to throughputs which may attain 5,000 and 6,000 kg per hour of production, and film widths attaining 9, 10 and sometimes more meters in width.

Moreover, economical constraints aim at considerably increasing the speed of the machines so as to reduce the sum of investments per kg of produced film. This increase in speed is expressed by the extension of the drawing machines, and most particularly of the transverse drawing machine, which consequently sees its energy consumption rise considerably.

This phenomenon is worsened by the fact that it is necessary to introduce into the most currently used plastic films for packaging, additives intended to improve the characteristics of the produced films by making them less capable of generating static electricity and improving the slideability of the films.

These additives, which are incorporated to the granules upon extrusion, generally have the drawback of evaporating when the ribbon which contains them is brought to temperatures required for drawing, and in particular in the transverse drawing machine, where this evaporation is facilitated by the surface area increase which results from the transverse drawing.

These evaporated additives of the film therefore mix with the hot air used for maintaining the temperature of the film in the transverse drawing machine, and their concentration in this air therefore increases rapidly gradually through the production. Of course they tend to concentrate on the cold portions of the machine, in the form of viscous liquid products which have serious disadvantages both on the film when they are deposited as droplets creating film breakages, or unacceptable black spots notably for producing film intended for the packaging of food products.

It is therefore necessary, in order to avoid there being an increase in the concentration of the vapors in the circulation air of the transverse drawing machine to the point of making the condensations and deposited droplets, incompatible with production, to remove a portion of the volume of circulating air in the enclosure of the transverse drawing machine and to replace it by clean air which will have to be heated up beforehand to the temperature of the transverse drawing machine so as to avoid cooling the latter, and condensation which would result from this. The proportions of air to be discharged are comprised between 5 and 45%, more generally between 10 and 25%, of the hot air circulating in the oven, and consequently represent a considerable expenditure of energy since this discharged volume has to be replaced with clean air, heated up beforehand to the desired temperature.

This energy expenditure, which is not directly related to the requirements of the method but to the necessity of avoiding condensation of undesirable products, represents a significant cost and which becomes unacceptable, regardless of the energies used for maintaining the temperature of the members of the machine, and which are either electric energy or the energy transported by a heat transfer fluid produced by a fuel or gas boiler, or finally by the use of direct gas heating in the air vein to be heated up.

The recovery of significant amounts of energy which is represented by the volume of hot air continuously extracted from the transverse drawing machine, therefore represents a significant economical goal and for which presently there is no satisfactory solution, since air/air exchanger devices, which would allow transfer to the clean air injected into the oven, of a portion of the energy required for heating up the clean replacement air, tend, for the reasons indicated above, to be very rapidly polluted by the condensation on the cold portions of the exchanger, of undesirable products. The latter appear in the form of a viscous, hard crust, which is difficult to clean, which after a few weeks makes the exchangers inoperative.

Also significant energy expenditure is itself inherent to the requirements of the method and results from the necessity of heating up, before the longitudinal drawing portion, the ribbon cooled beforehand so as to allow it to attain the longitudinal drawing temperature.

For this purpose, the extruded ribbon, cooled beforehand on the casting drum, passes over an assembly of preheating cylinders heated up by circulation of hot oil. The increase in the speed of the machines is proportionately expressed by the number of preheating cylinders for heating up the film, and is consequently expressed by increasing equipment and energy expenditures.

In the same way, the operation for cooling the extruded ribbon over the casting drum is expressed by considerable energy expenditures. Indeed, it is necessary that a cold unit be installed, the heat capacity of which at least corresponds to the calories which have to be rapidly removed from the film for its crystallization.

The requirement that this cooling be carried out rapidly, symmetrically on both sides of the film, and with very great temperature homogeneity over the width of the ribbon, involves circulation in the cooling drum and in the water container which surrounds it, of significant amounts of water which have therefore been accelerated so as to facilitate the exchange by means of pumps of great dimensions, themselves also great energy consumers.

The whole of these considerations, which correspond to the present state of the technology, ensures that the energy expenditures which correspond to the manufacturing of bi-oriented film on large throughput machines today takes up a significant and increasing proportion of the manufacturing costs of bi-oriented films.

BRIEF SUMMARY

The present invention aims at finding a remedy to these drawbacks.

The invention therefore provides a mechanical device for drawing a film in synthetic material which is of a simple and economical structure, and which allows improvement in the quality of produced film, while reducing in considerable proportions the energy expenditures required for producing this film.

For this purpose, the present invention relates to equipment for drawing a film in synthetic material in the longitudinal direction and the transverse direction, comprising transverse drawing means laid out so as to transversely draw the film, the transverse drawing means including a drawing enclosure in which the film is intended to be drawn, an air outlet aperture opening into the enclosure and an air inlet aperture opening into the enclosure, characterized in that the transverse drawing means further include an air recirculation circuit connecting the air inlet and outlet apertures and laid out so as to redirect the air from the air outlet aperture towards the air inlet aperture, and in that the air recirculation circuit includes a separation device with a cyclone comprising a body delimiting a separation chamber, and an inlet orifice opening into a separation chamber and connected to the air outlet aperture of the enclosure so as to allow the introduction of a air-additives mixture into the separation chamber, an air outlet orifice opening into the separation chamber and connected to the air inlet aperture of the enclosure, and an outlet orifice for additives opening into the separation chamber.

The use of a separation device with a cyclone positioned on such a circuit for recirculating fluid gives the possibility of perfectly cleaning the hot air volume extracted from the enclosure of the transverse drawing means, before reinjecting it into the latter. Indeed, because of the configuration of the separation chamber of a separation device with a cyclone, the air-additives mixture penetrating into the separation chamber will turn along the internal wall of the separation chamber, which causes centrifugation of the air-additives mixture. The result of this is coalescence of the drops of additives onto the internal wall of the separation chamber, and then the fall by gravity of the additives towards the outlet orifice for additives, and flow of the air without any additives through the air outlet orifice.

Additionally, the fact that the air exiting the separation device with a cyclone has a high temperature gives the possibility of limiting the energy expenditures required for raising the temperature of this air before reintroducing it into the drawing enclosure, and therefore limiting the energy expenditures of the equipment.

It should be noted that by additives are meant the additives incorporated to the granules upon extrusion and evaporated during the transverse drawing, as well as the vapors from these additives during the transverse drawing.

It should also be noted that the drawing enclosure advantageously forms a drawing oven.

Advantageously, the separation device with a cyclone comprises a liquid injection device laid out for injecting a liquid into the inside the body of the separation device with a cyclone and designed so that the injected liquid forms a liquid layer on at least one portion of the internal wall of the body of the separation device with a cyclone. The presence of such a liquid layer on the internal wall of the body of the separation device with a cyclone gives the possibility of trapping the particles of additives and facilitating their discharge towards the outlet orifice for additives, which protects the separation device with a cyclone from fouling. According to an embodiment of the invention, the liquid injection device includes at least one spray nozzle positioned in the body of the separation device with a cyclone. Advantageously, the liquid injection device may be a generator of mist, for example a water mist, laid out for generating and injecting a mist into the inside of the body of the separation device with a cyclone.

Preferably, the equipment comprises a first circuit for circulating fluid in which a heat transfer fluid circulates, the body of the separation device of the cyclone comprises an inlet for a heat transfer fluid and an outlet for a heat transfer fluid connected to the first circuit for circulation of fluid, and the separation device with a cyclone comprises a cooling pipe positioned in the body of the separation device with a cyclone and including a first end connected to the heat transfer fluid inlet and a second end connected to the heat transfer fluid outlet. These arrangements ensure heating up of the heat transfer fluid circulating in the first fluid circulation circuit during its passage in the cooling pipe, which is heated by the hot air crossing the separation device with a cyclone. This heat transfer fluid, heated to a temperature close to the temperature of the air extracted from the drawing enclosure, may advantageously be used in other areas of the equipment requiring heating of the film to be drawn. Consequently, the equipment according to the invention allows quasi-total recovery of the energy contained in the air extracted from the drawing enclosure.

It should be noted that the kinetic energy from the vortex movement of the air inside the body avoids the condensation of additive particles on the cooling pipe, which consequently remains clean.

According to an embodiment, the cooling pipe positioned inside the body of the separation device with a cyclone appears as a coil.

Advantageously, the equipment comprises first heating means positioned upstream from the transverse drawing means and intended for heating the film, the first heating means being connected to the first fluid circulation circuit.

Preferentially, the heat transfer fluid circulating in the first circulation circuit is water, and the first heating means includes a hot water tank equipped with an inlet orifice and an outlet orifice connected to the first fluid circulation circuit. Such a hot water tank gives the possibility of heating up the film cooled beforehand at the outlet of the casting drum by using simple mechanical means and the hot water recovered at the outlet of the separation device with a cyclone.

Advantageously, the equipment comprises longitudinal drawing means laid out for longitudinally drawing the film, the longitudinal drawing means preferably comprising a set of preheating cylinders, and a drawing unit positioned downstream from the set of preheating cylinders and having a succession of drawing cylinders. The longitudinal drawing means are for example positioned upstream from the transverse drawing means when the equipment is a sequential drawing piece of equipment.

Advantageously, the first heating means are positioned upstream from the longitudinal drawing means.

The presence of heating means, such as a hot water tank, upstream from the longitudinal drawing means gives the possibility in addition to the fact of recovering heat energy from the air extracted from the drawing enclosure, of considerably reducing the number of preheating cylinders required at the inlet of the longitudinal drawing machine, thereby strongly reducing its cost.

The passing of the extruded ribbon in such a water tank, also has the benefit of facilitating drying of the extruded ribbon, indispensable before the latter is brought into contact with the preheating cylinders of the longitudinal drawing machine. Indeed, on high speed machines, the drying of the film, when this is accomplished at the outlet of the cold water tank, has the drawback of requiring the use of high speed air flow, therefore of fans, themselves consuming significant electric energy. On the contrary, according to the invention, drying is largely facilitated by the reduction of the surface tension energy which reduces adhesion of the water droplets onto the extruded ribbon, and which itself contributes, by its internal temperature to the discharge of the water.

According to an embodiment, the equipment comprises a hood extending at least above the longitudinal drawing means and designed for recovering the ambient air at least partly heated by the latter and directing the latter towards the transverse drawing means.

Advantageously, the equipment comprises second heating means positioned between the air outlet orifice of the separation device with a cyclone and the air inlet aperture of the enclosure, said heating means for example including an exchanger or a gas burner.

Preferably, the second heating means positioned between the air outlet orifice of the separation device with a cyclone and the air inlet aperture of the enclosure include a gas burner equipped with an air collector positioned in an area of the hood located in proximity to the transverse drawing means. Thus, the hot ambient air collected by the hood, the temperature of which attains 50-60° C., is used for feeding oxygen to the gas burner. The calories used in this way reduce by as much the consumption of gas of the burner intended to heat up the air introduced into the drawing enclosure.

Advantageously, the equipment includes a second circuit for circulating fluid, in which a heat transfer fluid circulates, and the circuit for recirculating air includes at least one air/heat transfer fluid exchanger positioned between the air outlet aperture of the enclosure and the separation device with a cyclone, the exchanger including a heat transfer fluid inlet and a heat transfer fluid outlet connected to the second fluid circulation circuit.

Preferentially, the second circuit for separating fluid is made up so as to supply heat transfer fluid to the preheating cylinders of the longitudinal drawing means. Thus, the heat transfer fluid, heated up during its passing in the exchanger, is directly used as a heat transfer fluid inside the preheating cylinders in order to maintain the temperature of the latter, which allows optimum reuse of the energy extracted from the air extracted from the drawing enclosure.

The exchanger is preferably configured so that the air flowing out of the latter has a temperature above the condensation temperature of the additives, which gives the possibility of avoiding condensation of additives on the exchanger and therefore fouling of the latter.

BRIEF DESCRIPTION OF THE DRAWINGS

Anyway, the invention will be well understood by means of the following description with reference to the appended schematic drawing representing as non-limiting examples, several embodiments of this equipment.

DETAILED DESCRIPTION

Figure 1:
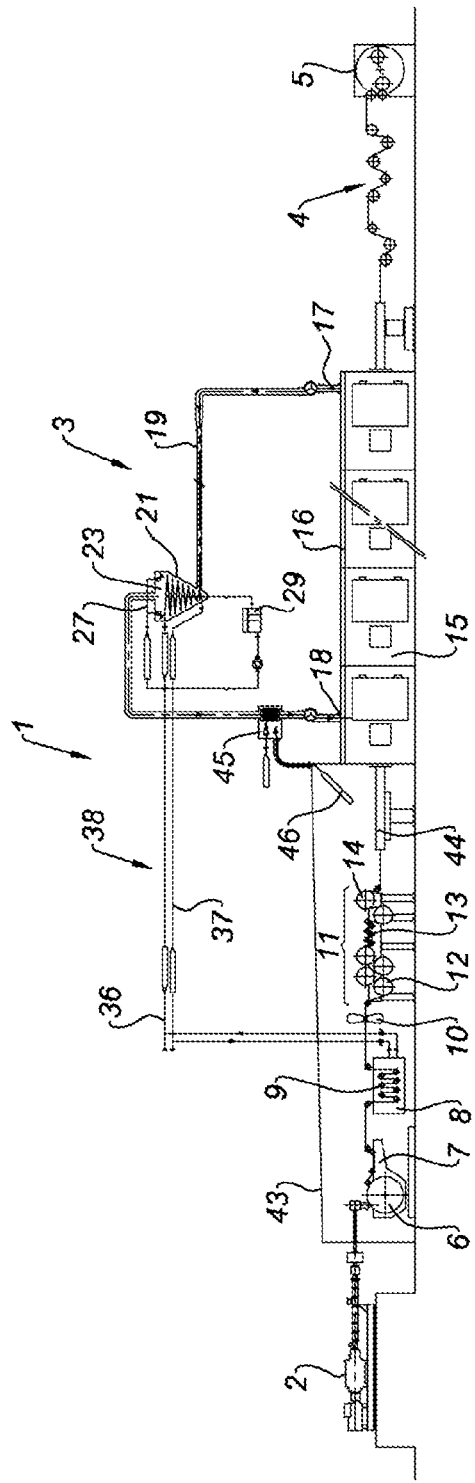
FIG. 1 is a schematic overall side view of a production line for a film in synthetic material including drawing equipment according to a first embodiment of the invention.
Figure 2:
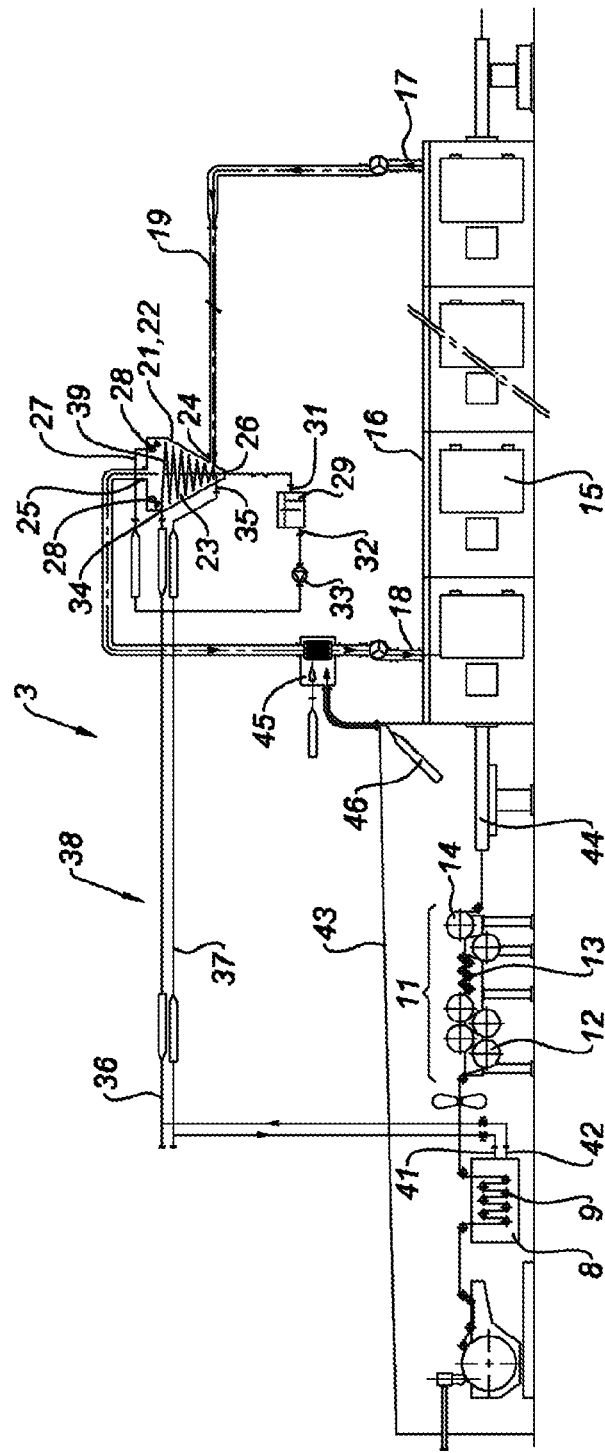
FIG. 2 is a schematic partial view, at an enlarged scale, of the drawing equipment of FIG. 1.

FIG. 1 illustrates a production line 1 for a film in synthetic material including an extruder 2, equipment 3 for sequential drawing of a film in synthetic material in the longitudinal direction and in the transverse direction, a set of treatment cylinders 4 and a winding device 5.

The equipment 3 comprises from upstream to downstream (with reference to the running direction of the film to be drawn):

- a casting drum 6,
- a cold water tank 7,
- a hot water tank 8 preferably provided with detour cylinders 9,
- a drying device 10,
- a longitudinal drawing machine 11 including a set of preheating cylinders 12, a drawing unit 13 positioned downstream from the set of preheating cylinders and having a succession of drawing cylinders, and a thermostabilization unit 14 positioned downstream from the drawing unit 13 and having a succession of cylinders, the function of which is to provide thermal expansion and stabilization of the film, before the subsequent transverse drawing of this film,
- a transverse drawing machine 15.

The transverse drawing machine 15 includes a drawing enclosure 16 in which the film is intended to be drawn transversely, an air outlet aperture 17 opening into the drawing enclosure 16 and an air inlet aperture 18 opening into the drawing enclosure 16.

The transverse drawing machine 15 further includes a circuit for recirculating air 19 connecting the air inlet and outlet apertures 18, 17 and laid out for redirecting the air from the air outlet aperture 17 to the air inlet aperture 18.

The air recirculation circuit 19 includes a separation device with a cyclone 21 comprising a body 22 delimiting a separation chamber 23. The separation chamber 23 includes a cylindrical upper portion extended with a tapered lower portion converging oppositely to the upper portion.

The separation device with a cyclone 21 further includes an inlet orifice 24 opening tangentially into the separation chamber 23 and connected to the air outlet aperture 17 of the enclosure 16 so as to allow introduction of an air-additives mixture into the separation chamber 23.

The separation device with a cyclone 21 further includes an air outlet orifice 25 opening axially into the upper portion of the separation chamber and connected to the air inlet aperture 18 of the enclosure 16, and an additive outlet orifice 26 opening into the lower end of the separation chamber 23.

The separation device with a cyclone 21 comprises a liquid injection device 27 laid out for injecting a liquid into the inside of the body 22 of the separation device with a cyclone 21 and designed so that the injected liquid forms a liquid layer on at least one portion of the internal wall of the body 22 of the separation device with a cyclone 21. The liquid injection device 27 may according to an embodiment be a generator of mist, for example a water mist, laid out for generating and injecting a mist into the inside of the body of the separation device for the cyclone.

Advantageously, the liquid injection device 27 includes at least two spray nozzles 28 positioned in the body 22 of the separation device with a cyclone 21.

Preferably, the equipment includes a decanter 29 comprising an inlet orifice 31 connected to the additive outlet orifice 26 and an outlet orifice 32 connected to the liquid injection device 27 via a pump 33. The decanter 29 is intended to separate the liquid injected into the body 22 by the liquid injection device 27 and the additives separated in the separation chamber 23. It should be noted that the decanter 29 may be replaced with a filter intended for trapping the additives and that the liquid injected into the separation device 21 by the liquid injection device 27 preferably circulates in a closed circuit.

The body 22 of the separation device with a cyclone 21 comprises a heat transfer fluid inlet 34 and a heat transfer fluid outlet 35 respectively connected to the fluid bringing 36 and fluid returning 37 conduits of a first fluid circulation circuit 38 in which a heat transfer fluid is intended to circulate, which is water according to the embodiment illustrated in FIG. 1.

The separation device with a cyclone 21 also comprises a cooling pipe 39 positioned in the body 22 of the separation device with a cyclone 21 and appearing as a coil. The cooling pipe 39 includes a first end connected to the heat transfer fluid inlet 34 and a second end connected to the heat transfer fluid outlet 35. The separation device of the cyclone 21 thus forms a cyclonic exchanger.

It should be noted that the hot water tank 8 is equipped with an inlet orifice 41 and an outlet orifice 42 which are respectively connected to the fluid return conduit 37 and to the fluid supply conduit 36 of the first fluid circulation circuit 38.

The equipment 3 comprises a hood 43 extending above the casting drum 6, the hot water tank 8, the longitudinal drawing machine 11 and the inlet portion 44 of the transverse drawing machine 13. The hood 43 advantageously has an upper tilted portion and is designed for collecting the ambient air, heated by the different elements of the equipment covered by the hood, which rises by convection and directing this heated air towards the inlet portion 44 of the transverse drawing machine 13.

The air recirculation circuit 19 includes heating means positioned between the air outlet orifice 25 of the separation device with a cyclone 21 and the air inlet aperture 18 of the enclosure 16. According to the embodiment illustrated in FIG. 1, the heating means include a gas burner 45 equipped with an air collector 46 positioned in an area of the hood 43 located in proximity to the inlet portion 44 of the transverse drawing machine.

Figure 3:
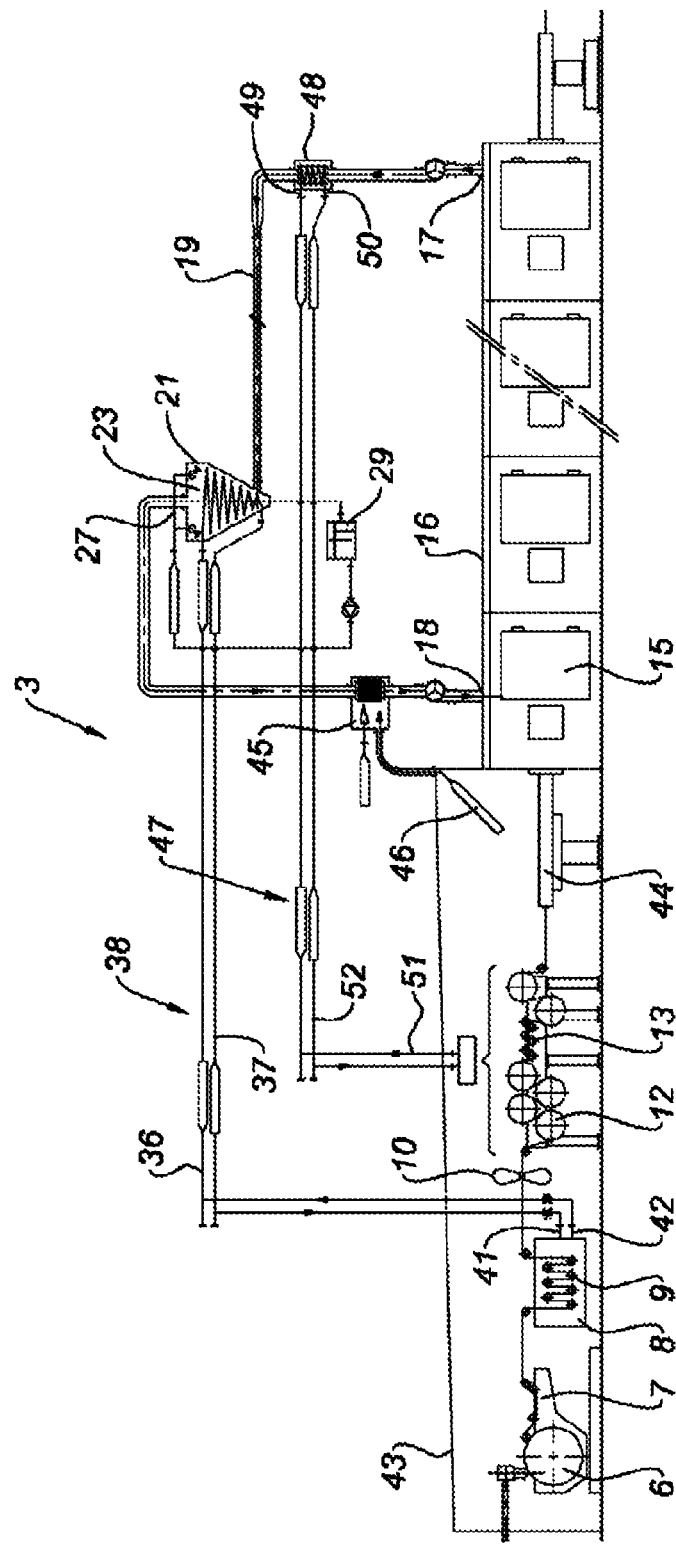
FIG. 3 is a schematic overall side view of drawing equipment according to a second embodiment of the invention.

FIG. 3 illustrates an installation 3 for sequential drawing of a film in a synthetic material according to a second embodiment which differs from the one illustrated in FIG. 1 essentially in that the equipment includes a second fluid circulation circuit 47 in which a heat transfer fluid circulates, and in that the air recirculation circuit 19 includes an air/heat transfer fluid exchanger 48 positioned between the air outlet aperture 17 of the enclosure 16 and the separation device with a cyclone 21, the exchanger 48 including a heat transfer fluid inlet 49 and a heat transfer fluid outlet 50 respectively connected to the conduits for supplying a fluid and for returning a fluid 51, 52 of the second fluid circulation circuit 46.

The second fluid circulation circuit 47 is laid out so as to supply heat transfer fluid to the preheating cylinders 12 of the longitudinal drawing machine 11. The heat transfer fluid circulating in the second fluid circulation circuit 47 is preferably oil.

The exchanger 48 is preferably dimensioned so that the air flowing out of the latter has a temperature above the condensation temperature of the additives, and preferably greater by 5 to 10° C. than the condensation temperature of the additives. For example, in the case of polypropylene, the temperature of the air in the exchanger 48 may attain 170° C. and the outlet temperature of the air from the exchanger cannot be less than 120° C. in order to avoid condensation.

Figure 4:
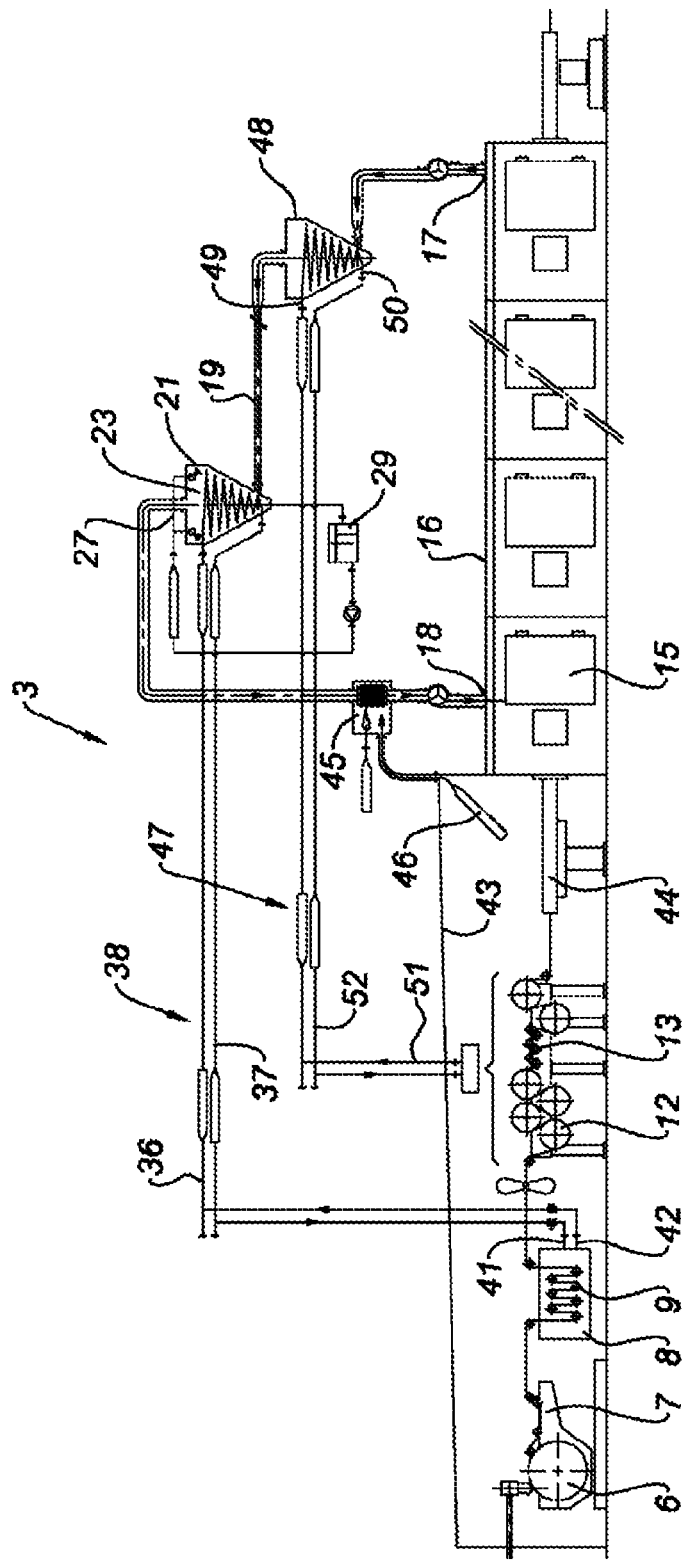
FIG. 4 is a schematic overall side view of drawing equipment according to a third embodiment of the invention.

FIG. 4 illustrates equipment 3 for sequential drawing of a film in synthetic material according to a third embodiment which differs from the one illustrated in FIG. 3, essentially in that the exchanger 48 positioned between the air outlet aperture 17 of the enclosure 16 and the separation device with a cyclone 21 is a cyclonic exchanger.

The efficiency, as regards energy recovery, of the different pieces of equipment described above, allows, without any economical drawback, an increase in the amount of air extracted from the transverse drawing machine beyond the 10 to 15% presently used, which has the advantage of a superior degree of cleanliness of the air circulating inside the transverse drawing machine, and therefore complete removal of the internal condensations of this machine. The result is the dual advantage of improving the quality of the produced films and also avoiding the deposition of these condensations on sensitive mechanical members which are inside the drawing enclosure, the chains, the nips, and the rails which circulate therein. These deposits are, in conventional machines, i.e. not equipped with the devices described above, by their simple presence, able to prevent the required lubrication of these mechanical members, which is expressed by serious incidents and a reduction in the lifetime of these members.

As this is obvious, this invention is not limited to the sole embodiments of this equipment, described above as examples, it, on the contrary, encompasses all the alternative embodiments. It is notably in this way that the equipment may be equipment for simultaneous drawing of films in synthetic material in which the drawing in the longitudinal direction of the drawing in the transverse direction take place simultaneously.

The invention claimed is:

1. Equipment for drawing a film in synthetic material, comprising:
   a first fluid circulation circuit in which a heat transfer fluid circulates,
   transverse drawing means configured to transversely draw the film, the transverse drawing means including a drawing enclosure in which the film is intended to be drawn, an air outlet aperture opening into the enclosure and an air inlet aperture opening into the enclosure,
   wherein the transverse drawing means further include an air recirculation circuit connecting the air inlet and outlet apertures and laid out so as to redirect the air from the air outlet aperture to the air inlet aperture, and
   wherein the air recirculation circuit includes a cyclone separation device comprising a body delimiting a separation chamber, an inlet orifice opening into the separation chamber and connected to the air outlet aperture of the enclosure so as to allow introduction of an air-additives mixture into the separation chamber, an air outlet orifice opening into the separation chamber and connected to the air inlet aperture of the enclosure, and an additive outlet orifice opening into the separation chamber,
   wherein the body of the cyclone separation device comprises a heat transfer fluid inlet and a heat transfer fluid outlet connected to the first fluid circulation circuit, and
   wherein the cyclone separation device comprises a cooling pipe positioned in the body of the cyclone separation device and including a first end connected to the heat transfer fluid inlet and a second end connected to the heat transfer fluid outlet.

2. The equipment according to claim 1, wherein the cyclone separation device comprises a liquid injection device laid out for injecting a liquid inside the body of the cyclone separation device and designed so that the injected liquid forms a liquid layer over at least one portion of the internal wall of the body of the cyclone separation device.

3. The equipment according to claim 2, wherein the liquid injection device is a generator of mist laid out so as to generate and inject a mist into the inside of the body of the cyclone separation device.

4. The equipment according to claim 1, wherein the cooling pipe positioned inside the body of the cyclone separation device appears as a coil.

5. The equipment according to claim 1, further comprising first heating means positioned upstream from the transverse drawing means and intended to heat the film, the first heating means being connected to the first fluid circulation circuit.

6. The equipment according to claim 5, wherein the heat transfer fluid circulating in the first fluid circulation circuit is water, and wherein the first heating means include a hot water tank equipped with an inlet orifice and an output orifice connected to the first fluid circulation circuit.

7. The equipment according to claim 1, further comprising longitudinal drawing means configured so as to longitudinally draw the film, the longitudinal drawing means comprising a set of preheated cylinders and a drawing unit positioned downstream from the set of preheating cylinders and having a succession of drawing cylinders.

8. The equipment according to claim 7, further comprising a hood extending at least above the longitudinal drawing means and designed for collecting the ambient air heated at least partly by the longitudinal drawing means and directing the latter towards the transverse drawing means.

9. The equipment according to claim 8, further comprising second heating means positioned between the air outlet orifice of the cyclone separation device and the air inlet aperture of the enclosure, said heating means for example including an exchanger or a gas burner.

10. The equipment according to claim 9, wherein the second heating means positioned between the air outlet orifice of the cyclone separation device and the air inlet aperture of the enclosure include a gas burner equipped with an air collector positioned in an area of the hood located in proximity to the transverse drawing means.

11. The equipment according to claim 7, further comprising a second fluid circulation circuit in which a heat transfer fluid circulates, and wherein the air recirculation circuit includes at least one air/heat transfer fluid exchanger positioned between the air outlet aperture of the enclosure and the cyclone separation device, the exchanger including a heat transfer fluid inlet and a heat transfer fluid outlet connected to the second fluid circulation circuit.

12. The equipment according to claim 11, wherein the exchanger is configured so that the air flowing out of the latter has a temperature above the condensation temperature of the additives.

13. The equipment according to claim 11, wherein the exchanger is a cyclonic exchanger.

14. The equipment according to claim 11, wherein the longitudinal drawing means comprise a set of preheating cylinders and a drawing unit positioned downstream from the set of preheating cylinders and having a succession of drawing cylinders, and wherein the second fluid circulation circuit is laid out for supplying heat transfer fluid to the preheating cylinders of the longitudinal drawing means.

* * * * *